US012688597B2

(12) United States Patent
Cao et al.

(10) Patent No.: US 12,688,597 B2
(45) Date of Patent: Jul. 21, 2026

(54) VOLUME MEASUREMENT METHOD AND AN APPARATUS BASED ON A DEPTH CAMERA, AND A COMPUTER-READABLE MEDIUM

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Conghan Cao, Changzhou (CN); Jiang Yin, Changzhou (CN); Song Zhang, Changzhou (CN); Chao Fang, Changzhou (CN); Hongqing Song, Changzhou (CN); Zhenyu Dai, Changzhou (CN); Fenping Qian, Changzhou (CN); Huanbing Cheng, Changzhou (CN); Shenhui Wang, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 302 days.

(21) Appl. No.: 18/287,828

(22) PCT Filed: Apr. 24, 2022

(86) PCT No.: PCT/CN2022/088772
§ 371 (c)(1),
(2) Date: Oct. 20, 2023

(87) PCT Pub. No.: WO2022/228343
PCT Pub. Date: Nov. 3, 2022

(65) Prior Publication Data
US 2024/0362812 A1 Oct. 31, 2024

(30) Foreign Application Priority Data
Apr. 28, 2021 (CN) .......................... 202110467474.7

(51) Int. Cl.
*G06T 7/62* (2017.01)
*G01F 17/00* (2006.01)

(52) U.S. Cl.
CPC ................ *G06T 7/62* (2017.01); *G01F 17/00* (2013.01); *G06T 2207/10028* (2013.01)

(58) Field of Classification Search
CPC .. G06T 7/62; G06T 2207/10028; G01F 17/00
See application file for complete search history.

(56) References Cited

U.S. PATENT DOCUMENTS 6,389,322 B1 * 5/2002 Park ....................... A47C 31/11
703/2
9,412,189 B2 8/2016 Bendall et al.
(Continued)

FOREIGN PATENT DOCUMENTS

JP 8-14851 A 1/1996

*Primary Examiner* — Gregory M Desire
(74) *Attorney, Agent, or Firm* — Standley Law Group LLP; Jeffrey S. Standley; Adam J. Smith

(57) ABSTRACT

A volume measurement method and apparatus using a depth camera, and a computer-readable medium, are provided. A first depth image of a reference countertop is acquired which includes coordinate and depth data of pixels, the reference countertop adapted for placement of a measured object. The coordinate and depth data are substituted into countertop (Continued)

empirical equations to obtain simulated images. Each of the countertop empirical equations represent a height variation pattern of the reference countertop. A correlation between each of the simulated images and the first depth image is calculated. A simulated image with the highest correlation is used as a target image of the reference countertop. A countertop height of the reference countertop is obtained based on the target image, a height of the measured object is calculated using the countertop height, and a volume of the measured object is calculated using the height. These disclosures improve accuracy of object volume measurement.

15 Claims, 4 Drawing Sheets

(56)                     References Cited

U.S. PATENT DOCUMENTS

| | | | |
|---|---|---|---|
| 9,846,963 B2 * | 12/2017 | Patkar | G06T 17/00 |
| 10,467,352 B2 * | 11/2019 | Czmyrid | G06F 30/13 |
| 10,630,959 B2 | 4/2020 | Olmstead | |
| 11,709,916 B1 * | 7/2023 | Binion | G06Q 30/0623 |
| | | | 382/159 |

* cited by examiner

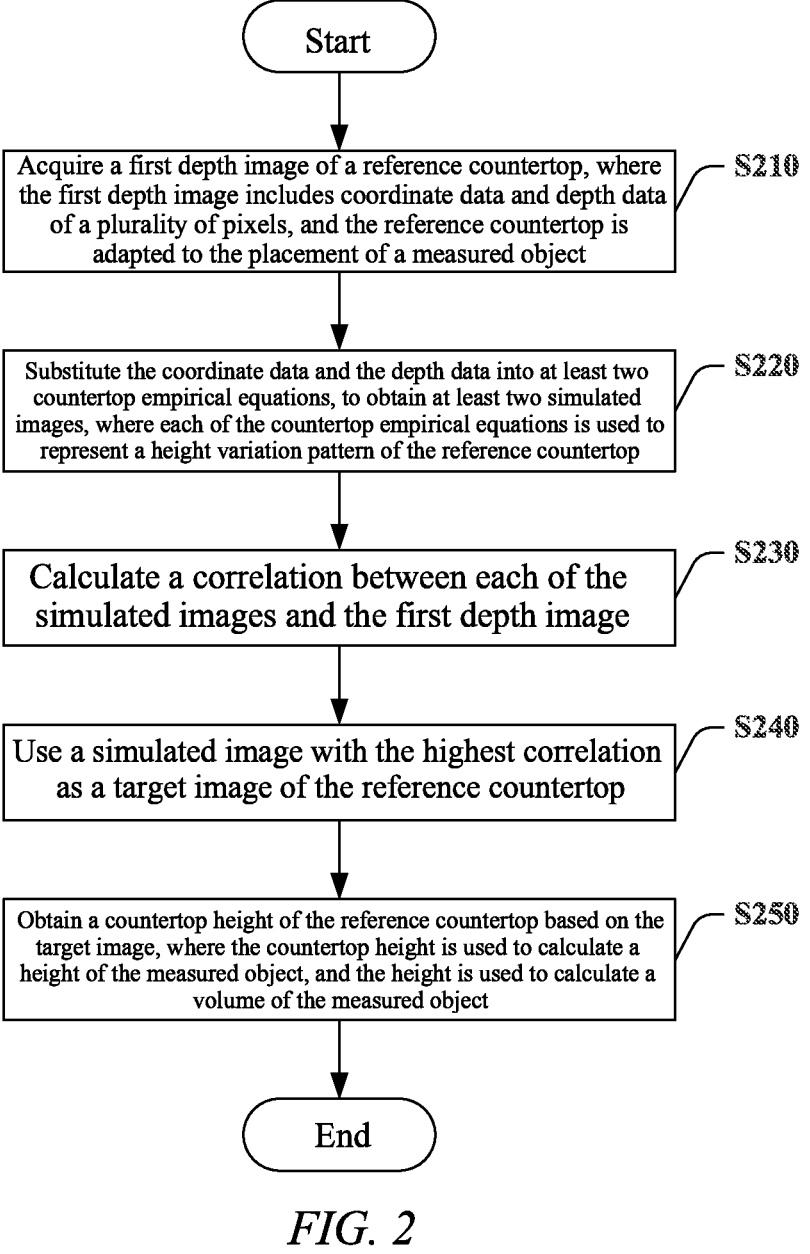

Start

Acquire a first depth image of a reference countertop, where the first depth image includes coordinate data and depth data of a plurality of pixels, and the reference countertop is adapted to the placement of a measured object — S210

Substitute the coordinate data and the depth data into at least two countertop empirical equations, to obtain at least two simulated images, where each of the countertop empirical equations is used to represent a height variation pattern of the reference countertop — S220

Calculate a correlation between each of the simulated images and the first depth image — S230

Use a simulated image with the highest correlation as a target image of the reference countertop — S240

Obtain a countertop height of the reference countertop based on the target image, where the countertop height is used to calculate a height of the measured object, and the height is used to calculate a volume of the measured object — S250

End

*FIG. 2*

VOLUME MEASUREMENT METHOD AND AN APPARATUS BASED ON A DEPTH CAMERA, AND A COMPUTER-READABLE MEDIUM

FIELD OF THE INVENTION

The present invention relates to the technical field of an object volume measurement, and in particular, to a volume measurement method and an apparatus based on a depth camera, and a computer-readable medium.

BACKGROUND AND SUMMARY OF THE INVENTION

With the continuous development of automation technologies, there are high requirements for an accuracy of object volume measurement. FIG. 1A is a schematic diagram in which a depth camera is used to measure a volume of an object. As shown in FIG. 1A, an object 110 is placed on a measurement platform 120, a depth camera 130 is located directly above the object 110 and the measurement platform 120, and there is a specific distance between the depth camera 130 and the object 110. As shown in FIG. 1A, the depth camera 130 has a specific photographing range. During measurement, the depth camera 130 can obtain distances from both, the measurement platform 120 and the object 110. Referring to FIG. 1A, a distance between the depth camera 130 and the measurement platform 120 is h0. Since the object 110 is an irregular object and has two heights, distances between the depth camera 130 and the object 110 are h1 and h2, respectively. The distances represent plane distances between a plane S of the depth camera 130 and a plane of the photographed object. h0-h1 and h0-h2 represent the two heights of the object 110. Based on the two heights and a surface area of the object 110, a volume of the object 110 can be obtained. Therefore, the accuracy of the obtained heights of the object is very important for accurate measurement of the volume.

When no object is placed on the measurement platform 120, a depth value z measured by the depth camera 130 represents a distance between the camera plane S and a plane of the measurement platform 120. In the infinitely extended plane of the measurement platform 120, depth values obtained by the depth camera 130 should be same. However, the depth values are not the same due to reasons such as inaccuracy in the installation of dual cameras, and inaccuracy in camera position relative to camera plane S and plane of the measurement platform 120.

FIG. 1B is a top view corresponding to FIG. 1A. As shown in FIG. 1B, in a field of view 131 of the depth camera 130, the object 110 covers nearly most of the area of the measurement platform 120, with a part of the bottom extending out of the measurement platform 120. In some cases, due to an installation space and other problems, the surface area of the measurement platform 120 may be less than the bottom area of the object 110. At present, a height of a centre point of the measurement platform 120 is usually used as a reference height to calculate an actual height of the object 110. However, the height of the centre point does not represent heights of all points on the measurement platform 120. Especially for a part of the object 110 that extends out of the measurement platform 120, a height measurement result thereof may be inaccurate, resulting in an inaccurate volume measurement result of the object 110.

A technical problem to be solved by the present invention is to provide a volume measurement method and an apparatus based on a depth camera, and a computer-readable medium, which allows for accurate measurement of a height of an object.

In order to solve the above-mentioned technical problem, the present invention provides a method of measuring volume based on a depth camera, comprising: acquiring a first depth image of a reference countertop, where the first depth image includes coordinate data and depth data of a plurality of pixels, and the reference countertop is adapted to the placement of a measured object; substituting the coordinate data and the depth data into at least two countertop empirical equations, to obtain at least two simulated images, where each of the countertop empirical equations is used to represent a height variation pattern of the reference countertop; calculating a correlation between each of the simulated images and the first depth image; using a simulated image with the highest correlation as a target image of the reference countertop; and obtaining a countertop height of the reference countertop based on the target image, where the countertop height is used to calculate a height of the measured object, and the height is used to calculate a volume of the measured object.

In an embodiment of the present invention, the first depth image obtained is an image obtained by the depth camera when the measured object is not placed on the reference countertop.

In an embodiment of the present invention, the reference countertop has a first size, the first depth image has a second size, and the second size is less than the first size.

In an embodiment of the present invention, after the target image is obtained, the method further includes: making a target size of the target image greater than or equal to a third size of the measured object, where the third size is greater than the first size of the reference countertop.

In an embodiment of the present invention, a size of the simulated image is same as that of the first depth image.

In an embodiment of the present invention, the step of substituting the coordinate data and the depth data into at least two countertop empirical equations, to obtain at least two simulated images includes: substituting the coordinate data and the depth data into each of the countertop empirical equations, to obtain empirical coefficients of each of the countertop empirical equations; and generating a corresponding simulated image according to the countertop empirical equation with the empirical coefficients.

In an embodiment of the present invention, the countertop empirical equations include a first countertop empirical equation for expressing a first height variation pattern of the reference countertop, where according to the first height variation pattern, a distance between a centre point of the reference countertop and a camera plane of the depth camera is greater than distances between non-centre points of the reference countertop and the camera plane of the depth camera.

In an embodiment of the present invention, the first countertop empirical equation is expressed as the following formula:

$$Z(x, y) = k_1 \times \sqrt{x^2 + y^2} + b_1$$

where x represents the abscissa of a pixel in the first depth image, y represents the ordinate of the pixel in the first depth image, Z(x, y) represents depth data of the pixel with coordinates (x, y), and k1 and b1 are first empirical coefficients.

In an embodiment of the present invention, the countertop empirical equations include a second countertop empirical equation for expressing a second height variation pattern of the reference countertop, where according to the second height variation pattern, there is an included angle between a plane of the reference countertop and a camera plane of the depth camera.

In an embodiment of the present invention, the second countertop empirical equation is expressed as the following formula:

$$Z(x, y) = b_2 + k_2 \times x + k_3 \times y$$

where x represents the abscissa of a pixel in the first depth image, y represents the ordinate of the pixel in the first depth image, Z(x, y) represents depth data of the pixel with coordinates (x, y), and k2, k3, and b2 are second empirical coefficients.

In an embodiment of the present invention, the included angle is an acute angle.

In order to solve the above-mentioned technical problem, the present invention further provides an apparatus for measuring a volume based on a depth camera, including: a memory configured to store instructions executable by a processor; and the processor configured to execute the instructions to implement the method described above.

In order to solve the above-mentioned technical problem, the present invention further provides a computer-readable medium for storing computer program code, where when the computer program code is executed by a processor, the method described above is implemented.

According to the present invention, at least two countertop empirical equations are used to simulate a depth image of a reference countertop, a simulated image with the highest similarity is selected as a target image of the reference countertop, a countertop height of the reference countertop is obtained from the target image, where the countertop height is closest to an actual height of the reference countertop, and a height of a measured object is then calculated based on the countertop height. In this way, the accuracy of object volume measurement can be improved.

BRIEF DESCRIPTION OF THE DRAWINGS

The accompanying drawings are included to provide a further understanding of the present application and are incorporated in and constitute a part of the present application. The drawings show the embodiments of the present application, and serve together with this specification to explain the principles of the present invention. In the drawings:

FIG. 2 is an exemplary flowchart of a volume measurement method based on a depth camera according to an embodiment of the present invention;

DETAILED DESCRIPTION OF EMBODIMENTS

Figure 1A:
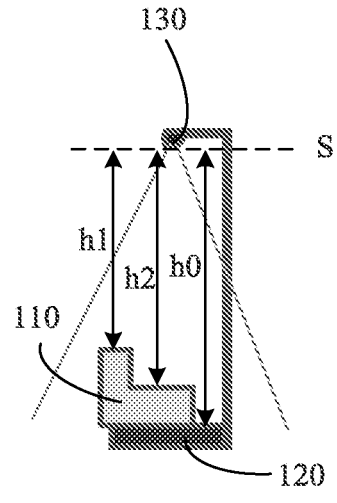
FIG. 1A is a schematic diagram in which a depth camera is used to measure a volume of an object.

To describe the technical solutions clearly, the embodiments of the present invention are described in detail below with reference to the accompanying drawings. The accompanying drawings in the following description show merely some examples or embodiments of the present application, and those of ordinary skilled in the art would apply the present application to other similar scenarios according to these drawings without any creative effort. Unless it is obvious from the context or otherwise stated, the same reference numerals in the accompanying drawings represent the same structure or operation.

As shown in the present application and the claims, unless the context expressly indicates otherwise, the words "a", "an", "said", and/or "the" do not specifically refer to the singular, but may also include the plural. Generally, the terms "include" and "comprise" only suggest that the expressly identified steps and elements are included, but these steps and elements do not constitute an exclusive list, and the method or device may further include other steps or elements.

Unless specifically stated otherwise, the relative arrangement of components and steps, numerical expressions and numerical values set forth in these embodiments do not limit the scope of the present application. In addition, it should be understood that, for ease of description, the sizes of various parts shown in the drawings are not drawn to scale. The technologies, methods, and devices known to those of ordinary skilled in the related art may not be discussed in detail, but where appropriate, the technologies, methods, and devices should be regarded as part of the authorization specification. In all examples shown and discussed here, any specific value should be interpreted as merely exemplary and not as limiting. Therefore, other examples of the exemplary embodiment may have different values. It should be noted that similar reference signs and letters refer to similar items in the following drawings. Therefore, once a specific item is defined in one of the drawings, it need not be further discussed in subsequent drawings.

In the description of the present application, it should be understood that, an orientation or position relationship indicated by orientation terms such as "front, rear, upper, lower, left, and right", "transverse, longitudinal, vertical, and horizontal", and "top and bottom" is usually based on an orientation or position relationship shown in the drawings, which is only for the convenience of describing the present application and simplifying the description. Unless otherwise stated, these orientation terms do not indicate or imply that an apparatus or element referred to must have a specific orientation or be constructed and operated in a specific orientation, so that the orientation terms cannot be understood as a limitation of the protection scope of the present application; and the orientation terms "inner and outer" refer to the inside and outside relative to the contour of each component itself.

For the convenience of description, spatially relative terms such as "on", "above", "on the top surface", and "upper" can be used herein to describe a spatial position relationship between a device or a feature shown in the figure and other devices or features. It should be understood that spatially relative terms are intended to include different orientations in use or operation in addition to the orientation of the device described in the figure. For example, if the device in the figure is inverted, the device described as "on other devices or structures" or "above other devices or structures" will then be positioned as "under other devices or structures" or "below other devices or structures". Therefore, the exemplary term "above" may include two orientations "above" and "below". The device may also be positioned in other different manners (rotated by 90 degrees or in other orientations), and spatially relative description used here is explained accordingly.

In addition, it should be noted that the use of words such as "first" and "second" to define parts is merely for the convenience of distinguishing between corresponding parts. Unless otherwise stated, the above words have no special meaning and therefore cannot be understood as a limitation of the protection scope of the present application. Furthermore, although the terms used in the present application are selected from well-known common terms, some of the terms mentioned in the specification of the present application may have been selected by the applicant according to his or her determination, and the detailed meaning thereof is described in the relevant section described herein. Furthermore, the present application must be understood, not simply by the actual terms used but also by the meanings encompassed by each term.

In the present application, a flowchart is used to illustrate the operations performed by a system according to the embodiments of the present application. It should be understood that the preceding or following operations are not necessarily performed exactly in order. Instead, the various steps may be processed in reverse order or simultaneously. In addition, other operations are added to these processes, or a certain step or several operations are removed from these processes.

FIG. 2 is an exemplary flowchart of a volume measurement method based on a depth camera according to an embodiment of the present invention. Referring to FIG. 2, the volume measurement method of this embodiment includes the following steps:

step S210: acquiring a first depth image of a reference countertop, where the first depth image includes coordinate data and depth data of a plurality of pixels, and the reference countertop is adapted to the placement of a measured object;

step S220: substituting the coordinate data and the depth data into at least two countertop empirical equations, to obtain at least two simulated images, where each of the countertop empirical equations is used to represent a height variation pattern of the reference countertop;

step S230: calculating a correlation between each of the simulated images and the first depth image;

step S240: using a simulated image with the highest correlation as a target image of the reference countertop; and step S250: obtaining a countertop height of the reference countertop based on the target image, where the countertop height is used to calculate a height of the measured object, and the height is used to calculate a volume of the measured object.

Figure 3:
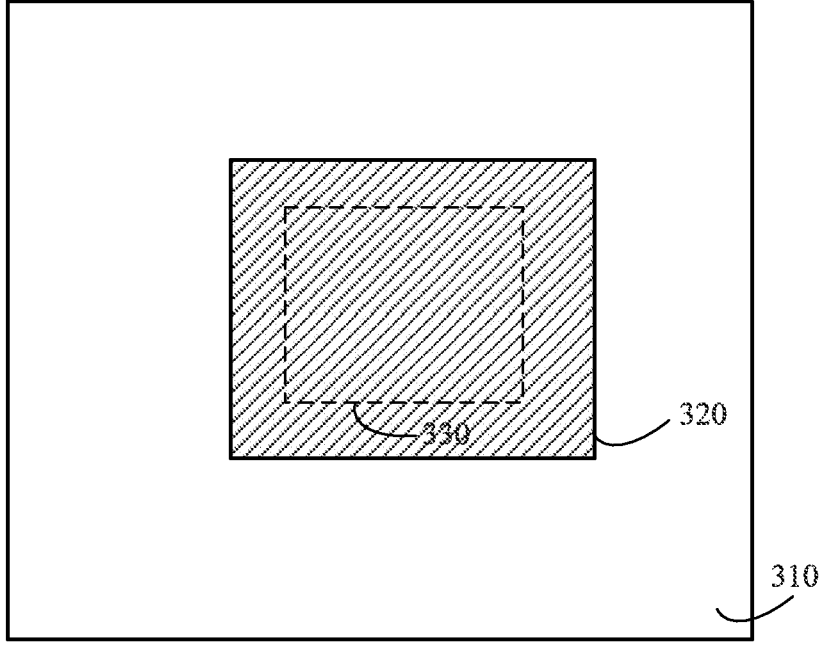
FIG. 3 is a schematic diagram of a depth image obtained in a volume measurement method according to an embodiment of the present invention.

FIG. 3 is a schematic diagram of a depth image obtained in a volume measurement method according to an embodiment of the present invention. The foregoing steps S210 to S250 are described below with reference to FIG. 3.

In step S210, the reference countertop is a countertop for the placement of the measured object, which may be the measurement platform 120 shown in FIG. 1A. The depth camera 130 shown in FIG. 1A can be used to obtain the first depth image of the reference countertop. Referring to FIG. 3, a first depth image 320 is located in a field of view 310 of the depth camera. The first depth image 320 is a depth image corresponding to the reference countertop, and includes all image information of the reference countertop. The first depth image 320 consists of a plurality of pixels, and each pixel has coordinate data and depth data. For example, the depth data of the first depth image 320 is represented by a matrix of 1280*720, and P(i,j,z) is represented by any one pixel point in the matrix, which means the depth value of the j-th row of i-th column is z, where i and j represent coordinate data. Further, $i<1280$, $j<720$ and z represents depth data i.e., the distance between the pixel point and the camera plane of the depth camera.

Referring to FIG. 3, the first depth image 320 is represented by a box, which indicates that the reference countertop is rectangular. FIG. 3 is merely for illustration and is not intended to limit a specific shape and size of the first depth image 320. In some embodiments, the reference countertop may be of any shape such as a rectangle, a circle, or a triangle, and the first depth image 320 is of any shape accordingly.

It should be emphasized that the first depth image obtained in step S210 is an image obtained by the depth camera when the measured object is not placed on the reference countertop. In other words, the first depth image does not include any information about the measured object.

Referring to FIG. 3, assuming that the reference countertop has a first size C1, the first depth image also has the first size C1. In subsequent steps, the coordinate data and the depth data in the first depth image are processed to obtain the countertop height of the reference countertop.

In some embodiments, the first depth image has a second size C2, and the second size C2 is less than the first size C1 of the reference countertop. Referring to FIG. 3, in these embodiments, the first depth image is represented by a dashed box 330, which includes a part of the image of the reference countertop. In other words, the first depth image of the reference countertop size is acquired, and the second size C2 of the first depth image is less than the first size C1 of the reference countertop. According to these embodiments, the small-sized first depth image is processed in the subsequent steps, which can increase the processing speed and reduce the processing complexity. In this specification, the first depth image of the second size C2 that is represented by the dashed box 330 is taken as an example to illustrate the subsequent steps S220 to S250.

In step S220, at least two countertop empirical equations are included. The countertop empirical equations are obtained by researchers by analyzing a large amount of measured data of the reference countertop. Each countertop empirical equation is used to represent a height variation pattern of the reference countertop. Ideally, the reference countertop is level, and all points on the reference countertop are at the same height and have the same distance to the camera plane. Therefore, this case can be expressed by a general plane equation. However, the reference countertop is not completely levelled. The reference countertop may be curved inward or outward, or the reference countertop may be an inclined plane with one end higher or lower than the other, etc. Each case can be expressed by a corresponding mathematical model, and a corresponding countertop empirical equation can be obtained by substituting height data of the reference countertop into each mathematical model. A specific mathematical model used by the countertop empirical equations is not limited in the present invention.

In some embodiments, the countertop empirical equations include a first countertop empirical equation for expressing a first height variation pattern of the reference countertop, where according to the first height variation pattern, a distance between a centre point of the reference countertop and a camera plane of the depth camera is greater than distances between non-centre points of the reference countertop and the camera plane of the depth camera. In these embodiments, the reference countertop described in the first height variation pattern features the centre point lower than the boundary, and the reference countertop has a shape similar to a funnel. Therefore, the distance between the centre point and the camera plane is longer, and the distances between the non-centre points in the periphery and the camera plane are shorter. Accordingly, the depth data of the first depth image has the characteristics of the first height variation pattern.

According to these embodiments, step S220 further includes: substituting the coordinate data and the depth data into each of the countertop empirical equations, to obtain empirical coefficients of each of the countertop empirical equations; and generating a corresponding simulated image according to the countertop empirical equation with the empirical coefficients.

In some embodiments, the first countertop empirical equation is expressed as the following formula:

$$Z(x, y) = k_1 \times \sqrt{x^2 + y^2} + b_1 \tag{1}$$

where x represents abscissa of a pixel in the first depth image, y represents an ordinate of the pixel in the first depth image, Z(x, y) represents depth data of the pixel with coordinates (x, y), and k1 and b1 are first empirical coefficients.

With regard to the foregoing embodiment, the first empirical coefficients k1 and b1 of the first countertop empirical equation (1) can be obtained by substituting the coordinate data (x, y) and the depth data Z of the first depth image into the first countertop empirical equation (1).

For example, through actual calculation, the first empirical coefficients are obtained: k1=0.015825 and b1=1.41363. Then, the first countertop empirical equation can be obtained:

$$Z(x, y) = 0.015825 \times \sqrt{x^2 + y^2} + 1.41363 \tag{2}$$

According to the first countertop empirical equation (2), a first simulated image can be generated.

In some embodiments, a size of the first simulated image is the same as that of the first depth image.

In some embodiments, the countertop empirical equations include a second countertop empirical equation for expressing a second height variation pattern of the reference countertop, where according to the second height variation pattern, there is an included angle between a plane of the reference countertop and a camera plane of the depth camera. In these embodiments, the reference countertop is inclined, and there is thus an included angle between the plane of the reference countertop and the camera plane. If the plane of the reference countertop and the camera plane are extended indefinitely, they will intersect with each other. Accordingly, the depth data of the first depth image has the characteristics of the second height variation pattern. By taking the embodiment shown in FIG. 3 as an example, assuming that the reference countertop is an inclined plane with the left end higher than the right, a distance between the left end of the first depth image represented by the dashed box 330 and the camera plane is shorter, and a distance between the right end of the first depth image and the camera plane is longer.

In some embodiments, the included angle is an acute angle.

In some embodiments, the second countertop empirical equation is expressed as the following formula:

$$Z(x, y) = b_2 + k_2 \times x + k_3 \times y \tag{3}$$

where x represents the abscissa of a pixel in the first depth image, y represents the ordinate of the pixel in the first depth image, Z(x, y) represents depth data of the pixel with coordinates (x, y), and k2, k3, and b2 are second empirical coefficients.

With regard to the foregoing embodiment, the second empirical coefficients k2, k3, and b2 of the second countertop empirical equation (3) can be obtained by substituting the coordinate data (x, y) and the depth data Z of the first depth image into the second countertop empirical equation (3).

For example, through actual calculation, the second empirical coefficients are obtained: k2=0.59385, k3=0.018809, and b2=1.41363. Then, the second countertop empirical equation can be obtained:

$$Z(x, y) = 1.41363 + 0.59385 \times x + 0.018809 \times y \tag{4}$$

According to the second countertop empirical equation (4), a second simulated image can be generated.

In some embodiments, a size of the second simulated image is the same as that of the first depth image.

In step S230, a correlation between each of the simulated images and the first depth image is calculated. The correlation can represent consistency between each of the simulated images and the first depth image. A method for calculating the correlation is not limited to the present invention. Those skilled in the art may use any known method. For example, a ratio of a difference between two sets of data of the simulated images and the first depth image to absolute values of the two sets of data is calculated. Ideally, if the difference is zero, the two sets of data have the strongest correlation, and then, fitted data can best represent original data.

With reference to the foregoing embodiment, in step S230, a first correlation between the first simulated image and the first depth image and a second correlation between the second simulated image and the first depth image need to be calculated separately.

In some embodiments, before calculation of the correlation, the method may further include performing dimension reduction processing or data reduction processing on the simulated image and/or the first depth image, to reduce the complexity of correlation calculation. For example, the simulated image is originally a 16-bit image, and the 16-bit image is converted into an 8-bit image.

In step S240, the simulated image with the highest correlation is used as a target image of the reference countertop.

In the above example, the first countertop empirical equation (2) is used to obtain the first simulated image, where a first correlation coefficient between the first simulated image and the first depth image is 0.9875; and the second countertop empirical equation (4) is used to obtain the second simulated image, where a second correlation coefficient between the second simulated image and the first depth image is 0.9879. The second correlation coefficient is larger, indicating that the second countertop empirical equation (4) is more in line with the actual variation pattern of the reference countertop. Therefore, the second simulated image is used as the target image of the reference stage.

It can be understood that for an embodiment with more than two countertop empirical equations, a countertop empirical equation with the highest correlation is selected, and a simulated image with the highest correlation is used as a target image of the reference countertop.

In step S250, a countertop height of the reference countertop is obtained based on the target image, wherein the countertop height is used to calculate a height of the measured object, and the height is used to calculate a volume of the measured object.

It can be understood that the countertop height reflected by the target image used in step S250 is closest to an actual countertop height of the reference countertop. Therefore, during volume measurement of the measured object, the measured object is placed on the reference countertop to obtain a depth image of the measured object, that is, a distance between an upper surface of the measured object and the camera plane, and an accurate height of the measured object can be obtained by subtracting a countertop height of the reference countertop at a corresponding position from the distance. Using the height to calculate the volume of the measured object has a relatively high accuracy.

A method for obtaining a sectional area of the measured object, and a method for calculating a volume of the measured object by using a height of the measured object are not limited to the present invention.

In some embodiments, after step S240 of obtaining the target image, the method further includes: making a target size of the target image greater than or equal to a third size of the measured object, where the third size is greater than the first size of the reference countertop. According to these embodiments, the third size C3 of the measured object is greater than the first size C1 of the reference countertop. Therefore, when the measured object is placed on the reference countertop, part of the measured object may protrude out of the reference countertop, and an error is easily caused to height measurement of the protruding part particularly. The size of the target image may originally be the second size C2, and the second size C2 is less than the first size C1 of the reference countertop. According to these embodiments, the size of the target image is expanded to the third size C3 that is greater than or equal to the first size C1. Since the target image has a corresponding countertop empirical equation, it is only required to calculate, according to the countertop empirical equation, the corresponding depth data based on coordinates of a part to be expanded, so as to obtain the target image of the third size C3.

Figure 1B:
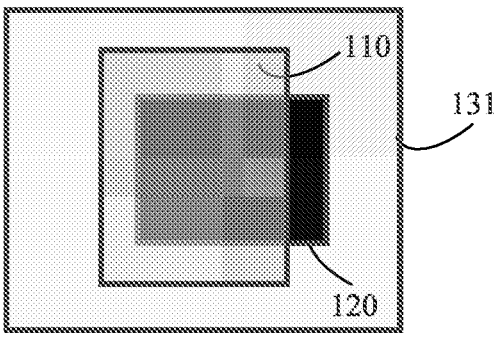
FIG. 1B is a top view corresponding to FIG. 1A.

In the foregoing embodiment, the third size of the measured object may be a size of a bottom surface of the measured object. During volume measurement of the measured object, the bottom surface of the measured object is in contact with the reference countertop. The third size may also be a contour area observed in the top view as shown in FIG. 1B when the measured object is placed on the reference countertop.

According to the foregoing volume measurement method, when the size of the target image is made greater than or equal to the size of the bottom surface of the measured object, the size of the target image can be adjusted based on the size of the measured object, so as to obtain more countertop height data of the reference countertop, thereby facilitating calculation of the height of the measured object of a larger size, and further improving the accuracy of object volume measurement.

The present invention further includes an apparatus for measuring volume based on a depth camera. The apparatus includes a memory and a processor. The memory is configured to store instructions executable by the processor. The processor is configured to execute the instructions to implement the volume measurement method based on the depth camera as described above.

Figure 4:
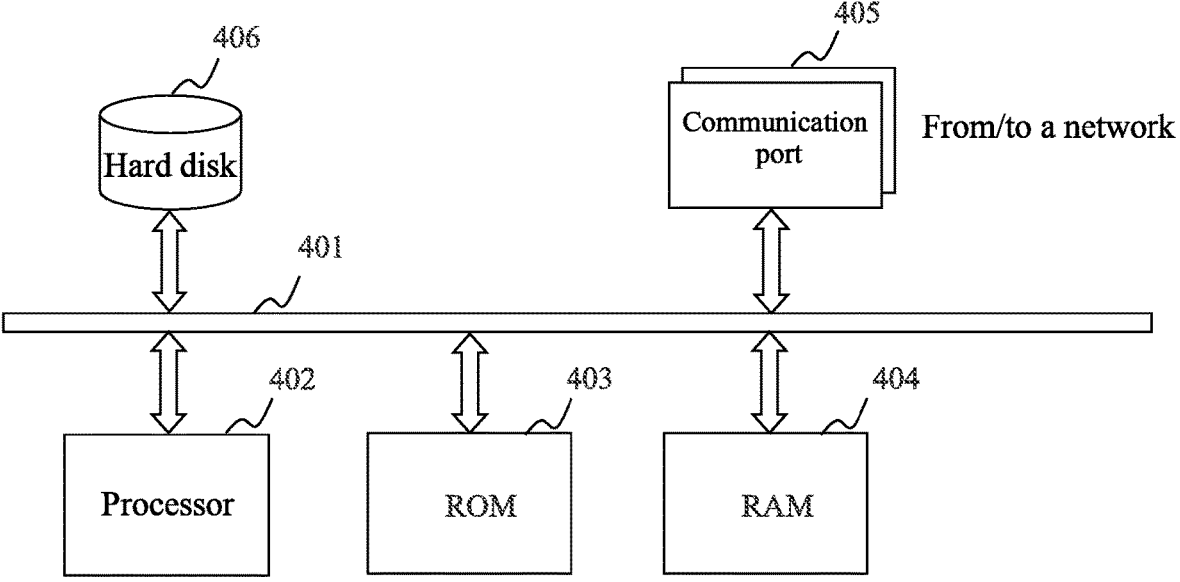
FIG. 4 is a system block diagram of a volume measurement apparatus based on a depth camera according to an embodiment of the present invention.

FIG. 4 is a system block diagram of an apparatus for measuring volume based on a depth camera according to an embodiment of the present invention. Referring to FIG. 4, the apparatus 400 may include an internal communication bus 401, a processor 402, a read-only memory (ROM) 403, a random access memory (RAM) 404, and a communication port 405. When applied to a personal computer, the volume measurement apparatus 400 may further include a hard disk 406. The internal communication bus 401 can implement data communication between components of the volume measurement apparatus 400. The processor 402 can perform determination and give a prompt. In some embodiments, the processor 402 may be composed of one or more processors. The communication port 405 can implement data communication between the volume measurement apparatus 400 and the external network or devices. In some embodiments, the volume measurement apparatus 400 can receive and send information and data from/to a network through the communication port 405. The volume measurement apparatus 400 may further include different forms of program storage units and data storage units, such as the hard disk 406, the read-only memory (ROM) 403 and the random access memory (RAM) 404, which can store various data files used for computer processing and/or communication, and possible program instructions executed by the processor 402. The processor executes these instructions to implement the main part of the method. A processing result from the processor is transmitted to a user equipment through the communication port and displayed on a user interface.

The foregoing volume measurement method may be implemented as a computer program, stored in the hard disk 406, and can be loaded into the processor 402 for execution, so as to implement the volume measurement method as described in the present application.

The present invention further includes a computer-readable medium storing computer program code, where when the computer program code is executed by a processor, the volume measurement method based on a depth camera as previously described is implemented.

The volume measurement method based on a depth camera may also be stored, as an article of manufacture, in the computer-readable storage medium when implemented as the computer program. For example, the computer-readable storage media may include, but are not limited to, a magnetic storage device (e.g., a hard disk, a floppy disk, and a magnetic stripe), an optical disc (e.g., a compact disc (CD), and a digital versatile disc (DVD)), a smart card, and a flash memory device (e.g., an electrically erasable programmable read-only memory (EPROM), a card, a stick, and a key driver). In addition, various storage media described herein can represent one or more devices and/or other machine-readable media for storing information. The term "machine-readable medium" may include, but is not limited to, wireless channels and various other media (and/or storage media) capable of storing, containing, and/or carrying code and/or instructions and/or data.

It should be understood that the embodiments described above are merely illustrative. The embodiments described herein can be implemented in hardware, software, firmware, middleware, microcode, or any combination thereof. For hardware implementation, the processor can be implemented in one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and/or other electronic units designed to perform the functions described herein, or a combination thereof.

Some aspects of the present application may be completely executed by hardware, or may be completely executed by software (including firmware, resident software, microcode, etc.), or may be executed by a combination of hardware and software. The hardware or software described above may all be referred to as "data block", "module", "engine", "unit", "component", or "system". The processor may be one or more application-specific integrated circuits (ASICs), digital signal processors (DSPs), digital signal processing devices (DSPDs), programmable logic devices (PLDs), field-programmable gate arrays (FPGAs), processors, controllers, microcontrollers, microprocessors, or a combination thereof. In addition, various aspects of the present application may be embodied as a computer product in one or more computer-readable media, and the product includes computer-readable program code. For example, the computer-readable media may include, but are not limited to, a magnetic storage device (for example, a hard disk, a floppy disk, a tape . . . ), an optical disc (for example, a compact disc (CD), a digital versatile disc (DVD) . . . ), a smart card, and a flash memory device (for example, a card, a stick, a key drive . . . ).

The computer-readable medium may contain a propagation data signal containing computer program code, for example, on a baseband or as part of a carrier. The propagation signal may take various forms, including an electromagnetic form, an optical form, etc., or a suitable combination form. The computer-readable medium may be any computer-readable medium other than a computer-readable storage medium. The medium may be connected to an instruction execution system, apparatus, or device to implement communication, propagation, or transmission of a program for use. The program code located on the computer-readable medium can be propagated through any suitable medium, including radio, a cable, a fibre-optic cable, a radio frequency signal, or a similar medium, or any combination of the foregoing media.

The basic concepts have been described above. Obviously, for those skilled in the art, the foregoing disclosure of the invention is merely an example, and does not constitute a limitation to the present application. Those skilled in the art may make various modifications, improvements, and amendments to the present application, although it is not explicitly stated here. Such modifications, improvements, and amendments are suggested in the present application, and therefore, such modifications, improvements, and amendments still fall within the spirit and scope of exemplary embodiments of the present application.

Also, the present application uses specific words to describe embodiments of the present application. For example, "one embodiment", "an embodiment", and/or "some embodiments" mean a certain feature, structure, or characteristic related to at least one embodiment of the present application. Therefore, it should be emphasized and noted that "an embodiment" or "one embodiment" or "an alternative embodiment" mentioned twice or more in different positions in this specification does not necessarily refer to the same embodiment. In addition, certain features, structures, or characteristics in one or more embodiments of the present application can be appropriately combined.

In some embodiments, numbers for describing the number of compositions and attributes are used. It should be understood that such numbers used in the description of the embodiments are modified by the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the specification and claims are approximate values, and the approximate values can be changed according to the required characteristics of individual embodiments. In some embodiments, for the numerical parameters, the specified significant digits should be taken into consideration and a general digit reservation method should be used. Although the numerical ranges and parameters used to confirm the breadth of the ranges of the numerical parameters in some embodiments of the present application are approximate values, such numerical values need to be set as precisely as possible within a feasible range in specific embodiments.

REFERENCE SIGNS LIST

Object 110
measurement platform 120
depth camera 130
field of view 131, 310
first depth image 320
dashed box 330
volume measurement apparatus 400
internal communication bus 401
processor 402
read-only memory 403
random access memory 404
communication port 405
hard disk 406
distance between the depth camera and the measurement platform h0
distance between the depth camera and object h1,h2
What is claimed is:

1. A method for measuring volume of an object based on data from a depth camera positioned to capture, within a field of view, at least part of a surface of a measurement platform for placement of the object, said method comprising:

acquiring, from the depth camera, a first depth image of the field of view, wherein the first depth image comprises coordinate data and depth data of a plurality of pixels, the depth data representing, for each of the pixels, a distance between a plane of the depth camera and the respective pixel;

substituting the coordinate data and the depth data into at least two countertop empirical equations, to obtain at least two simulated images, wherein each of the countertop empirical equations represent a height variation pattern of the measurement platform;

calculating a correlation between each of the simulated images and the first depth image;

using the simulated image with the highest correlation as a target image of the measurement platform; and obtaining a platform height of the measurement platform based on the target image, said platform height reflecting a distance between the camera plane and the measurement platform, wherein a height of the object is calculated using the platform height, and a volume of the object is calculated using the platform height.

2. The method according to claim 1, wherein the first depth image obtained is an image obtained by the depth camera when the object is not placed on the measurement platform.

3. The method according to claim 1, wherein the measurement platform has a first size, the first depth image has a second size, and the second size is less than the first size.

4. The method according to claim 1, further comprising: after the target image is obtained, making a target size of the target image greater than or equal to a size of the object, wherein the size of the object is greater than a size of the measurement platform.

5. The method according to claim 1, wherein a size of the simulated image is the same as that of the first depth image.

6. The method according to claim 1, wherein the step of substituting the coordinate data and the depth data into at least two countertop empirical equations, to obtain at least two simulated images comprises:

substituting the coordinate data and the depth data into each of the countertop empirical equations, to obtain empirical coefficients of each of the countertop empirical equations; and generating a corresponding simulated image according to the countertop empirical equation with the empirical coefficients.

7. The method according to claim 1, wherein the countertop empirical equations comprise a first countertop empirical equation for expressing a first height variation pattern of the measurement platform, wherein according to the first height variation pattern, a distance between a center point of the measurement platform and the camera plane of the depth camera is greater than distances between non-center points of the measurement platform and the camera plane of the depth camera.

8. The method according to claim 7, wherein the first countertop empirical equation is expressed as the following formula:

$$Z(x, y) = k_1 \times \sqrt{x^2 + y^2} + b_1$$

where x represents abscissa of a pixel in the first depth image, y represents an ordinate of the pixel in the first depth image, Z(x, y) represents depth data of the pixel with coordinates (x, y), and k1 and b1 are first empirical coefficients.

9. The method according to claim 1, wherein the countertop empirical equations comprise a second countertop empirical equation for expressing a second height variation pattern of the measurement platform, wherein according to the second height variation pattern, there is an included angle between a plane of the measurement platform and the camera plane of the depth camera.

10. The method according to claim 9, wherein the second countertop empirical equation is expressed as the following formula:

$$Z(x, y) = b_2 + k_2 \times x + k_3 \times y$$

where x represents the abscissa of a pixel in the first depth image, y represents the ordinate of the pixel in the first depth image, Z(x, y) represents depth data of the pixel with coordinates (x, y), and k2, k3, and b2 are second empirical coefficients.

11. The method according to claim 9, wherein the included angle is an acute angle.

12. An apparatus for measuring volume based on data from a depth camera, said apparatus comprising:

a non-transitory memory configured to store instructions executable by a processor; and the processor configured to execute the instructions to implement the method of claim 1.

13. A non-transitory computer-readable medium for storing computer program code, wherein when the computer program code, when executed by a processor, implements the method of claim 1.

14. A method for measuring volume based on data from a depth camera, said method comprising:

acquiring a first depth image of a reference countertop, wherein the first depth image comprises coordinate data and depth data of a plurality of pixels, and the reference countertop is adapted for placement of a measured object;

substituting the coordinate data and the depth data into at least two countertop empirical equations, to obtain at least two simulated images, wherein each of the countertop empirical equations represent a height variation pattern of the reference countertop, including by:

substituting the coordinate data and the depth data into each of the countertop empirical equations, to obtain empirical coefficients of each of the countertop empirical equations; and generating a corresponding simulated image according to the countertop empirical equation with the empirical coefficients;

calculating a correlation between each of the simulated images and the first depth image;

using the simulated image with the highest correlation as a target image of the reference countertop; and obtaining a countertop height of the reference countertop based on the target image, wherein a height of the measured object is calculated using the countertop height, and a volume of the measured object is calculated using the height.

15. A method for measuring volume based on data from a depth camera, said method comprising:

acquiring a first depth image of a reference countertop, wherein the first depth image comprises coordinate data and depth data of a plurality of pixels, and the reference countertop is adapted for placement of a measured object;

substituting the coordinate data and the depth data into at least two countertop empirical equations, to obtain at least two simulated images, wherein each of the countertop empirical equations represent a height variation pattern of the reference countertop, and wherein the countertop empirical equations comprise a second countertop empirical equation for expressing a second height variation pattern of the reference countertop, wherein according to the second height variation pattern, there is an included angle between a plane of the reference countertop and a camera plane of the depth camera;

calculating a correlation between each of the simulated images and the first depth image;

using the simulated image with the highest correlation as a target image of the reference countertop; and obtaining a countertop height of the reference countertop based on the target image, wherein a height of the measured object is calculated using the countertop height, and a volume of the measured object is calculated using the height;

wherein the countertop empirical equations comprise a second countertop empirical equation for expressing a second height variation pattern of the reference countertop, wherein according to the second height variation pattern, there is an included angle between a plane of the reference countertop and a camera plane of the depth camera.

* * * * *